April 12, 1949.  W. V. HOBBS  2,466,809
PRESSURE MEASURING APPARATUS
Filed May 15, 1944.
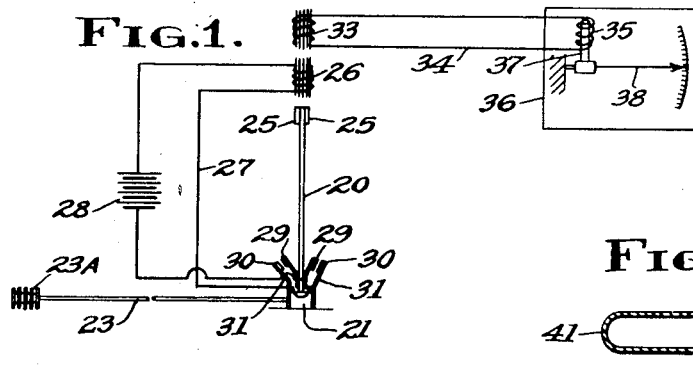
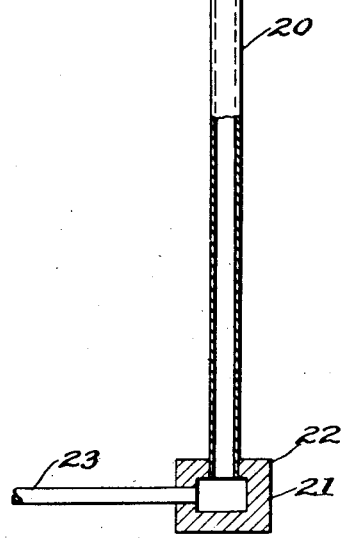
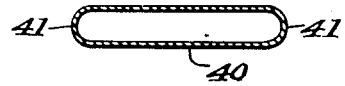
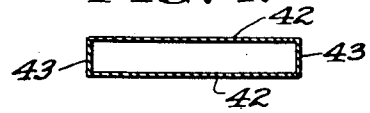
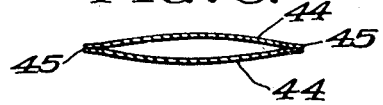
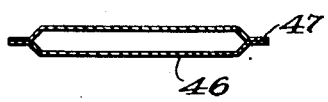
INVENTOR
Walter V. Hobbs
BY
Warren H. F. Schmieding
ATTORNEY Patented Apr. 12, 1949

2,466,809

UNITED STATES PATENT OFFICE 2,466,809

PRESSURE MEASURING APPARATUS

Walter V. Hobbs, Columbus, Ohio, assignor to Ranco Incorporated, a corporation of Ohio Application May 15, 1944, Serial No. 535,656

6 Claims. (Cl. 73—398)

This invention relates to measuring and indicating mechanism and is particularly directed to improvements in such mechanism of the type which employ variable frequency reeds or analogous devices.

In certain measuring or indicating devices a vibrating member is used to create impulses in an electric circuit in which a frequency meter is embodied to show the immediate vibratory characteristics of the member. In these devices means are provided to change the vibratory characteristics of the member in accordance with variations in a selected condition. The frequency meter is so calibrated that the changes occurring in the condition may be directly gauged through observation of the indicator of the frequency meter.

An object of this invention is to provide a novel variable frequency member which may be used in the indicating devices mentioned above.

Another object of the invention is to provide a variable frequency member having an elongated hollow body supported for vibratory movement, the member being so constructed that changes in the differential between internal and external pressures on the member will change the frequency of vibration thereof.

A further object of the invention is to provide a variable frequency member having an elongated body of rectangular cross section, the body being formed of this sheet material so that when pressure is applied internally thereto the resistance to deflection will change and consequently variations in the resonant frequency will occur.

An object is to provide a variable frequency device embodying a member having elongated strip-like sides joined at their longitudinal edges and at one end, the opposite end being open to admit fluid under pressure to effect a stiffening of the member thereby varying its resonant frequency.

Further objects and advantages of the present invention will be apparent from the following description, reference being had to the accompanying drawings wherein preferred forms of embodiments of the invention are clearly shown.

In the drawings:

Fig. 1 is a diagrammatic view of a measuring device embodying a a variable frequency reed formed in accordance with the present invention;

Fig. 2 is an elevational view partly in vertical section of a reed formed in accordance with the invention; and Figs. 3 to 6, inclusive, are horizontal cross-sections taken through the reed shown in Fig. 2 or various modifications thereof.

Referring more particularly to Fig. 1 of the drawings, the indicator in which the reed 20 has been embodied includes a mounting 21 to which the reed 20 has been rigidly secured at one end. The mounting comprises a hollow block 22, the interior of which communicates with the interior of the reed 20 and a suitable source of pressure through a capillary tube 23. To provide a suitable source of pressure, use may be made of a bellows 23A or other pressure transmitting element containing a fluid by means of which force can be transmitted. This bellows 23A is connected to the free end of tube 23. The upper end of the reed 20 is closed as at 24 and if desired, this upper end may be provided with a block or plates 25 which are subject to magnetic forces.

The upper end of the reed terminates adjacent an electro-magnet 26 disposed in an electric circuit 27 in which is also connected a battery 28 or other source of electric energy used to energize the magnet 26. The circuit 27 also includes a plurality of pairs of cooperating contact members 29 and 30. In the present instance two pairs of contacts are utilized, the contacts 29 being mounted on the reed 20 and the contacts 30 being stationarily supported on either side of the reed by the block 22 or other suitable support. The contacts 30 are carried by flexible members 31 so that after the contacts 29 have engaged the contacts 30, continued movement of the reed will not injure the contacts or their supports. When the reed vibrates or oscillates from side to side, the contacts 29 will alternately engage the contacts 30 at each side of the reed to complete the circuit 27 and provide for current flow to the electro-magnet 26. When this circuit is completed, the upper end portion of the reed will be at one side or the other of the electro-magnet 26 and its energization will create a magnetic field which tends to move the end of the reed back toward a central position. Before this position is reached, however, the contacts 29 and 30 which have been engaged will separate to interrupt current flow through the circuit to the electro-magnet 26. The force applied to the reed, however, is sufficient to cause it to continue its movement past the normal position until the contacts 29 and 30 at the opposite side are engaged to again complete circuit 27, at which time, electro-magnet 26 will be energized. The magnetic field thus created will cause the reed to move in the opposite direction and the cycle will be repeated.

The rate at which the reed moves back and forth or vibrates will depend upon the resonant frequency of the reed. The continued engagement and separation of the contacts and the resulting intermittant energization of the electromagnet 26 will induce an alternating current in a coil 33 located adjacent the electro-magnet 26. The coil 33 is arranged in a circuit 34 in which is also arranged field coil 35 of a frequency meter 36. This meter has an armature 37 which is attracted when the coil 35 is energized, an indicator 38 being associated with the armature to show the response of that member to current flow through the coil 35. Thus when the reed is vibrated by the electro-magnet, the frequency meter 36 will indicate the rate at which the reed is vibrating.

To use this mechanism for measuring pressure, it is proposed to vary the resonant frequency of the reed in proportion to the change in the pressure or other condition being observed. To secure this result, the capillary tube 23 and the pressure responsive device 23A communicate with the interior of the block 22, which in turn, communicates with the interior of the reed 20. If the device 23A is exposed to pressure, it will tend to collapse and apply pressure to the fluid contained therein which fluid will flow through the capillary tube 23 into the interior of the body 22 and thence into the reed 20. As the pressure in the reed increases, the resonant frequency of the reed will change, this frequency increasing with pressure increase and decreasing when the pressure falls.

As shown in Figs. 3 to 6, inclusive, the cross-sectional formation of the tube may be widely varied. In Fig. 3, the tube is shown as possessing a substantially oval cross-section. In this form, the sides 40 of the oval are flat and are connected by curved end walls 41. In Fig. 4, the tube or reed has a rectangular shape, the parallel sides 42 being connected by parallel ends 43. In Fig. 5, the tube is formed from a pair of flat strips 44 joined at their longitudinal edges 45. In Fig. 6, the reed has flat sides 46, the longitudinal edges of which are bent toward one another and joined as at 47. In each of these forms, the reed comprises an elongated hollow body of elastic material adapted to be rigidly supported and which is closed at one end and open to a source of pressure at the opposite end whereby the internal pressure on the reed can be varied to change its resonant frequency. Certain of the modifications will be more responsive to vibratory forces than the others due to their particular construction. The use to which the reeds are to be placed will determine the form of reed to be employed.

Although the reeds have been described as being designed to receive fluid internally to effect a change in the normal frequency of vibration thereof, it should be obvious that the change results from varying the pressure differential between the interior and exterior of the tube 23 and that this pressure differential may be changed in any suitable manner and, for example, by varying the external rather than the internal pressure as shown in the preferred embodiment.

While the forms of embodiments of the present invention as herein disclosed constitute preferred forms, it is to be understood that other forms might be adopted, all coming within the scope of the claims which follow:

I claim:

1. In a pressure measuring apparatus, in combination, a vibratory reed in the form of an elongated hollow member of elastic material supported for vibratory movement and adapted to contain a fluid, said member being closed at one end and open at the other end, means for varying the resonant frequencies of said member comprising means adapted for connecting the open end of the hollow member with a variable source of pressure for varying the fluid pressure differential between the interior and exterior of the hollow member in response to changes of pressure in said source of pressure; and means for imparting vibratory movement to said member.

2. In a pressure measuring apparatus, in combination, a vibratory reed in the form of an elongated hollow thin walled member of elastic material rigidly supported at one end for vibratory movement and adapted to contain a fluid, said member being closed at one end and open at the supported end, means for varying the resonant frequencies of said member comprising means adapted for connecting the open end of the member with a variable source of pressure for varying the fluid pressure differential between the interior and exterior of the hollow member in response to changes in pressure in said source of pressure; and means for imparting vibratory movement to the reed.

3. In a pressure measuring apparatus, in combination, a vibratory reed in the form of an elongated hollow thin walled member of elastic material rigidly supported at one end for vibratory movement and adapted to contain a fluid and having a cross section with a greater length than width, said member being closed at one end and open at the supported end, means for varying the resonant frequencies of said member comprising means adapted for connecting the open end of the member with a variable source of pressure for varying the fluid pressure differential between the interior and exterior of the hollow member in response to changes in pressure in said source of pressure; and means for imparting vibratory movement to the reed.

4. In a pressure measuring apparatus, in combination, a vibratory reed in the form of an elongated hollow thin walled member of elastic material rigidly supported at one end for vibratory movement and adapted to contain a fluid and having a rectangular cross section, said member being closed at one end and open at the supported end, means for varying the resonant frequencies of the reed comprising means adapted for connecting the open end of the member with a variable source of pressure for varying the fluid pressure differential between the interior and exterior of the hollow member in response to changes in pressure in said source of pressure; and means for imparting vibratory movement to the reed.

5. In a pressure measuring apparatus, in combination, a vibratory reed in the form of an elongated hollow member of elastic material rigidly supported at one end for vibratory movement and adapted to contain a fluid and having a pair of thin opposed side walls joined at their longitudinal edges, the edges of said walls at one end also being joined, said wall edges being open at the supported end, means for varying the resonant frequencies of the reed comprising means adapted for connecting the open end of the hollow member with a variable source of pressure for varying the fluid pressure differential between the interior and exterior of the member in response to changes of pressure in said source of pressure; and means for imparting vibratory movement to the reed.

6. In a pressure measuring apparatus, in combination, a vibratory reed comprising an elongated hollow rigid elastic member adapted to contain a fluid and having one end closed and the other end open, means connected with said open end for supporting said member for vibratory movement, means for varying the resonant frequencies of the reed comprising means adapted for connecting the open end of the member with a variable source of pressure for varying the fluid pressure differential between the interior and exterior of the hollow member in response to changes in pressure in said source of pressure; and means for imparting vibratory movement to the reed.

WALTER V. HOBBS.

REFERENCES CITED

The following references are of record in the file of this patent:

UNITED STATES PATENTS

| Number | Name | Date |
|---|---|---|
| 408,655 | Deagan et al. | Aug. 6, 1889 |
| 674,604 | Deagan | May 21, 1901 |
| 864,461 | Gibbs | Aug. 27, 1907 |
| 1,100,672 | Deagan | June 16, 1914 |
| 1,468,383 | Guy | Sept. 18, 1923 |
| 1,524,868 | Knoll | Feb. 3, 1925 |
| 2,206,837 | Edwards | July 2, 1940 |
| 2,219,036 | Mason | Oct. 22, 1940 |

FOREIGN PATENTS

| Number | Country | Date |
|---|---|---|
| 348,940 | Great Britain | May 21, 1931 |